United States Patent [19]

Hermanson

[11] Patent Number: 4,519,486
[45] Date of Patent: May 28, 1985

[54] ENGINE FLYWHEEL BRAKE TOGGLE MECHANISM

[75] Inventor: William O. Hermanson, Kiel, Wis.

[73] Assignee: Tecumseh Products Company, Tecumseh, Mich.

[21] Appl. No.: 417,411

[22] Filed: Sep. 13, 1982

[51] Int. Cl.³ .............................................. B60K 41/20
[52] U.S. Cl. ................................. 192/3 S; 192/0.082; 192/0.094; 56/11.3; 74/491
[58] Field of Search .................. 192/3 TR, 3 S, 3 M, 192/1, 2, 0.058, 0.094, 0.082; 74/471 R, 479, 480 R, 501 R, 491; 56/11.3, 10.8, 10.5; 123/179 C, 179 K, 179 SE

[56] References Cited

U.S. PATENT DOCUMENTS

| 2,985,992 | 5/1961 | Dowdle | 56/11.3 |
|---|---|---|---|
| 3,228,177 | 1/1966 | Coates . | |
| 3,253,391 | 5/1966 | Meldahl | 56/11.3 |
| 3,290,871 | 12/1966 | Haas . | |
| 3,773,156 | 11/1973 | Nyquist | 192/0.094 |
| 4,035,994 | 7/1977 | Hoff . | |
| 4,048,787 | 9/1977 | Harkness et al. | 56/11.3 |
| 4,048,788 | 9/1977 | Kamlukin et al. | 56/11.3 |
| 4,117,651 | 10/1978 | Martin | 192/0.094 |
| 4,181,206 | 1/1980 | Seilenbinder | 192/0.058 |
| 4,394,893 | 7/1983 | Kronich et al. | 192/3 S |

Primary Examiner—George H. Krizmanich
Attorney, Agent, or Firm—Albert L. Jeffers; John F. Hoffman

[57] ABSTRACT

An arrangement for rapidly halting an internal combustion engine powered implement upon release of a deadman control by the implement operator where a spring actuated braking member engages an annular friction surface on the engine flywheel and the engine ignition system is also disabled is disclosed employing a spring biased toggle moveable between folded and extended positions as the deadman lever moves respectively between actuated and released positions so as to provide a relatively constant force opposing operator actuation of the deadman lever. An additional operator actuated control lever may move the toggle beyond the extent possible due to deadman lever operation for engaging a starter mechanism when the deadman lever is actuated by the operator.

15 Claims, 4 Drawing Figures

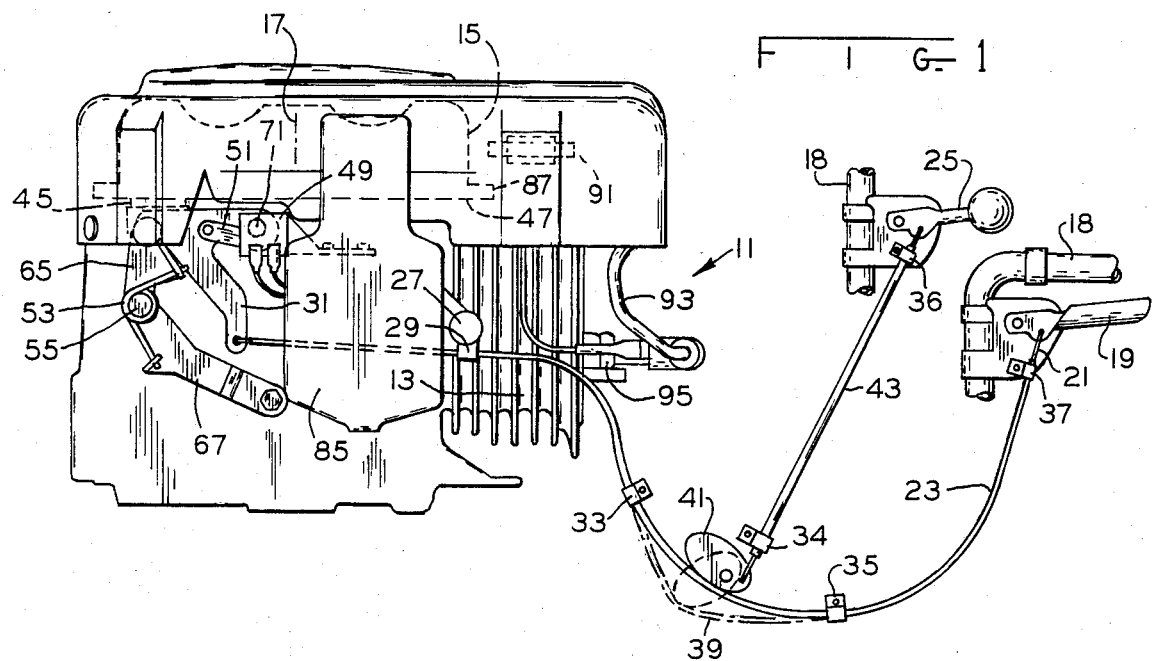
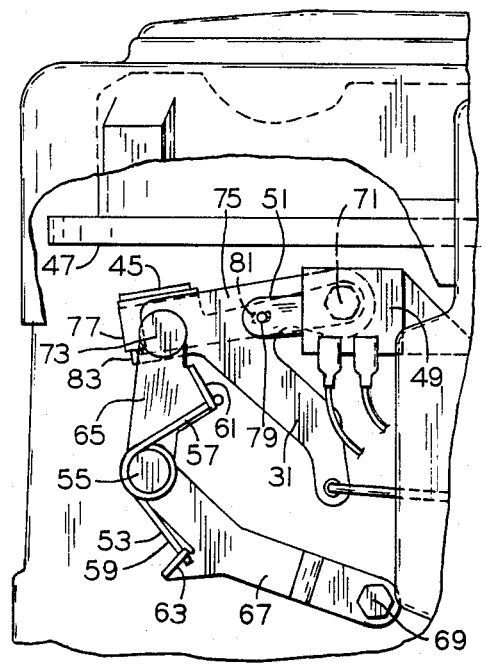
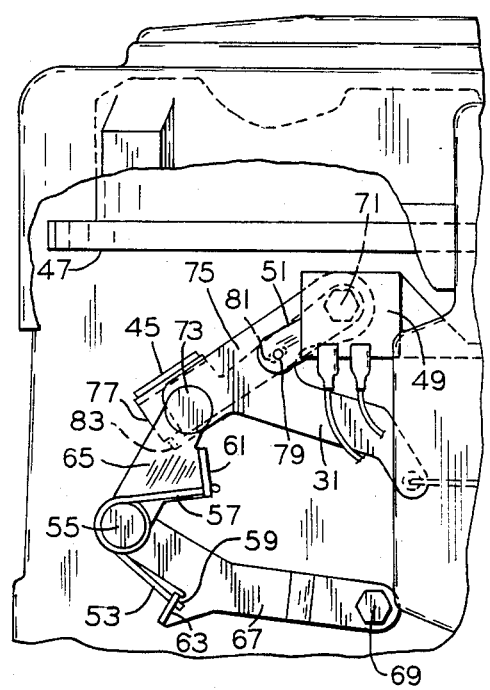
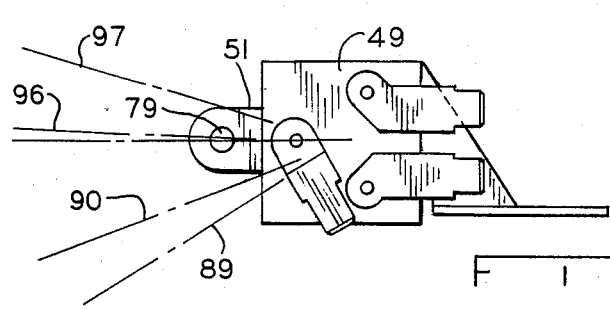

ENGINE FLYWHEEL BRAKE TOGGLE MECHANISM

BACKGROUND OF THE INVENTION

Field of the Invention

The present invention relates generally to safety devices for internal combustion engine powered implements and more particularly to such safety devices which function to promptly stop the engine in the event that the implement operator moves from his normal operating position. Even more specifically, the present invention is concerned with an improved linkage arrangement for such safety devices requiring a relatively constant operator actuating force.

The need for safety devices for power driven implements to reduce the probability of injury to the operator or others has long been recognized and a wide variety of such safety devices are known. The provision of a protective shield or shroud around dangerous moving parts is commonplace as is the automatic disabling of a dangerous implement when its normal operating mode is interrupted.

A typical illustration of the disabling type safety device is the so-called deadman lever. Such levers are frequently employed on the handle of lawnmowers, garden tillers, snowblowers, and the like, and require the operator to be gripping the handle and depressing the lever against a normal spring bias to render the device operational. In the event that the operator releases his grip on the handle, the deadman lever moves typically away from the handle to a position to disable the device. One such known deadman level disables the ignition circuit on an internal combustion engine rotary lawnmower. Another known deadman lever arrangement is connected to an idler wheel or pulley in the V-belt drive arrangement for a garden tiller with that pulley spring biased toward a position away from the V-belt. Under these conditions the V-belt drive is interrupted since the belt is larger than required to connect the engine to the tiller moving parts and only when the deadman lever is depressed forcing the pulley into engagement with the V-belt and removing slack from the V-belt drive is the tiller operational.

Another known application of a deadman lever to a power driven implement is the interposition of a clutch brake arrangement between the power source such as an internal combustion engine and the dangerous implement such as the rotating blade of a rotary lawnmower or snowthrower. The deadman lever when depressed actuates the clutch to couple the power source to the rotating blade, while when the lever is released the clutch is disengaged and a brake actuated to stop the rotating blade.

It would be highly desirable to retain the advantages of the deadman level type safety device without the necessity of providing a clutch drive between the power source and the dangerous instrumentality and further highly desirable to reduce as far as possible the time interval between the release of the deadman lever and the stopping of the dangerous instrumentality. It would also be highly desirable to provide a safety device wherein the operator must return to his normal operating position before the instrumentality may be reenergized. These desires, as well as others, have been achieved in co-pending U.S. patent application Ser. No. 205,010, filed Nov. 7, 1980, the entire disclosure of which is specifically incorporated herein by reference.

Briefly, in the aforementioned co-pending application, flywheel braking is achieved upon the release of a deadman control by pivoting a braking member into engagement with a lower annular surface of the flywheel or by moving the braking member generally parallel to the flywheel lower annular surface and into engagement therewith by a ramp arrangement forcing the braking member toward the flywheel surface. In either case, the force between the braking member and the flywheel surface is the force determined by the spring or other arrangement forcing those two surfaces together, and it is this same force which must be overcome by the operator when actuating the deadman lever to disengage the brake, and it would be highly desirable to provide the advantages and safety features of the aforementioned co-pending application while reducing the force required on the deadman control to maintain the brake arrangement disengaged.

This further desire has been realized in co-pending U.S. patent application Ser. No. 321,769, filed Nov. 16, 1981, wherein upon initial engagement between a flywheel braking surface and a brake pad the continued flywheel rotation induces additional movement of the brake pad wedging the friction surface of that pad more tightly against the flywheel thereby increasing the braking force. Thus, in the improvement represented by this co-pending patent application the strength of the spring against which the operator must hold the deadman lever during implement operation has been reduced; however, the system still generally follows Hooke's Law in that the stress or applied force on the deadman lever is directly proportional to the strain or resulting deformation of the spring biasing the braking member. Thus, while the overall strength of the spring has been reduced in this last-mentioned improvement, the operator still encounters successively greater resistance to actuation of the deadman lever the further that lever is moved against the spring biasing force. It would be highly desirable to provide a deadman lever-type safety device having the advantages of this last-mentioned co-pending application while circumventing Hooke's Law in the sense that the force the operator must apply to the deadman lever remains substantially constant regardless of the distance that lever is moved. It would also be highly desirable to retain the starting feature of the last-mentioned co-pending application wherein the Bowden cable coupling the deadman lever to the brake mechanism may be additionally moved by a second operator actuable control so as to place the engine in an electric start mode when the deadman lever is depressed by the operator. Accordingly, the entire disclosure of co-pending U.S. patent application Ser. No. 321,769, filed Nov. 16, 1981, is specifically incorporated herein by reference.

SUMMARY OF THE INVENTION

Among the several objects of the present invention may be noted the provision of a safety device which retains the objects and advantageous features of the aforementioned co-pending applications while improving other aspects thereof; the provision of an internal combustion engine powered implement safety device employing a deadman lever requiring a substantially uniform operator actuating force; the provision of a toggle actuated flywheel braking mechanism; the provision of a deadman lever arrangement for an implement which is less tiring to the operator during implement use; the provision of a safety device and engine starting arrangement employing but a single control cable and single electrical switch structure; and the provision of an operator implement control characterized by its simplicity and ease of operation. These as well as other objects and advantageous features of the present invention will be in part apparent and in part pointed out hereinafter.

In general, a safety device for an internal combustion engine includes a flywheel coupled to the engine crankshaft for rotation therewith, a braking member having a friction surface normally biased into engagement with an annular friction surface of that flywheel and a coupling arrangement between a deadman control and the braking member for retracting the friction surface out of engagement with the flywheel braking surface upon actuation of the deadman control by an implement operator. The coupling includes a pivotable linkage having first and second lever arms pivotably fastened to the engine and a third lever arm pivotably spanning the first and second arms so that the first and second arms pivot in unison about their respective engine pivot points to move the braking member relative to the flywheel annular surface. These pivotable linkages form a toggle and a spring biases that toggle from a folded position to an extended position so as to provide a relatively constant force opposing operator actuation of the deadman lever. If the engine has an electric start feature, the starting mechanism may be enabled upon movement against the spring biasing beyond the normal running position. This additional movement may be accomplished by an intermediate control lever fitting on a Bowden cable coupling the deadman control to the braking mechanism or simply by additional movement of the deadman control beyond its normal run position.

BRIEF DESCRIPTION OF THE DRAWING

FIG. 1 is a side elevation view of a portion of a vertical crankshaft, single cylinder internal combustion engine illustrating the safety device of the present invention and a portion of an implement and operator controls in the engine braking position;

FIG. 2 is an enlarged view of a portion of FIG. 1 illustrating the brake in its running position;

FIG. 3 is a view similar to FIG. 2 but illustrating the brake arrangement in the engine starting position; and FIG. 4 is an enlarged view of the three position switch employed in the present invention.

Corresponding parts are identified by corresponding reference characters throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring first to FIG. 1, an implement is powered by an internal combustion engine 11 having a cylinder 13 and flywheel 15 which rotates about the centerline 17 of the engine crankshaft to power the implement. The implement may be a lawnmower, snowthrower, garden tiller, or the like, with a handle 18 and deadman control lever 19 which is gripped by the implement operator by pulling the deadman control lever 19 toward the handle 18 so as to extract cable 21 from a sheath 23 of a conventional Bowden cable. The implement may include a second operator control lever 25 mounted on the implement handle 18, for example, lower than the deadman control lever 19 with that second control lever being operator actuable to start an electric start engine. Sheath 23 is clamped, for example, by bolt 27 and bracket 29 to the engine or some other fixed location so that movement of the deadman lever 19 toward handle 18 extracts cable 21 from the sheath 23 pulling the cable arm 31 toward the right as viewed in FIG. 1. Additional sheath clamping arrangements may be provided to relatively fixed portions of the implement as at 33, 34, 35, 36 and 37 and a section of sheathless cable 39 exposed to cam 41 under the control of a second Bowden cable 43 actuated by lever 25. Thus, movement of the lever 25 rotates cam 41 to displace the cable section 39 and cause further rightward movement of the cable arm 31 beyond that achievable by merely depressing the deadman lever 19. This additional rightward movement will be employed in the engine starting function to be described subsequently.

In essence, then, the angular position of the cable arm 31 determines the mode in which the engine is operating. In the position illustrated in FIG. 1, which is the most clockwise rotational position of the cable arm 31, the brake pad engages the lower annular rim 47 of flywheel 15 so that the engine is in its brake or stop mode. In this mode, deadman lever 19 is released as is the starter lever 25. Depression of deadman lever 19 rotates the cable arm 31 to the position illustrated in FIG. 2 which corresponds to the normal running mode of the engine with the brake pad 45 removed from the annular rim 47 and switch 49 in its engine ignition enabling position. With the control arm 51 of switch 49 in the position illustrated in FIG. 1, the engine ignition system is disabled. When deadman lever 19 is depressed and additionally starting lever 25 actuated, the cable arm 31 rotates counterclockwise an additional amount from that illustrated in FIG. 2 to that illustrated in FIG. 3 repositioning the switch control arm 51 so that not only the ignition is enabled, but, further, the electric start of the implement is enabled. Of course, upon starting lever 25 is released and the cable arm 31 returns to the run mode illustrated in FIG. 2.

Spring 53 is coiled about a stud 55 and has outwardly depending legs 57 and 59 engaging respective abutments 61 and 63 on legs or lever arms 65 and 67. Spring 53 functions not only to bias the deadman lever 19 toward its released or stopped position but also biases the brake pad 45 toward the annular surface 47 on the lower rim of flywheel 15. The braking member is retracted from engagement with the flywheel surface upon movement of the deadman lever to a second or running position by the operator and the nearly constant force which opposes this motion is achieved by a quadrangular linkage arrangement having an adjacent pair of vertices or pivot points 69 and 71 which are fixed relative to the engine, as well as a pair of adjacent floating pivot points, one represented by the stud 55 and the other at 73. The linkage arrangement then includes the lever arms 67 and 75 which are pivotably fastened to the engine and support a third lever arm 65 which joins the first and second lever arms 75 and 67 so that those arms pivot in unison about their respective engine pivot points 71 and 69 to move the braking member 77 and brake pad 45 relative to the flywheel annular surface 47. The switch 49 is actuated in accordance with movement of the braking member 77 by a pin 79 in the switch control arm 51 which engages a slot 81 in lever arm 75 moving the switch control arm 51 between the several positions illustrated in FIG. 4 with the uppermost position corresponding to an engine ignition system disabling position while the lowermost position corresponds to an ignition enabled and starter enabled position. The neutral position for arm 51 corresponds to the normal run mode where the ignition is enabled, the brake pad 45 withdrawn, and the starting system not energized. Spring 53, of course, urges lever arm 65 in a counterclockwise direction relative to the pivot 55 and arm 67. Thus, the spring joined lever arms 65 and 67 form a toggle biased by that spring to urge the braking member toward the flywheel annular surface with the arms being relatively angularly oriented so as to allow the spring to present a relatively constant force resisting motion of the deadman control 19 toward its second or running position. Preferably, this toggle angle, that is the angle between the line joining pivot points 73 and 55 on the one hand and pivot points 55 and 69 on the other hand, is preferably about 93° when the braking member is maximally distant from the annular surface 47 and this angle changes to about 118° when the braking member has brake pad 45 engaging the annular surface.

While the braking member 77 could simply comprise a brake pad mounted directly on arm 75, in the preferred embodiment illustrated the braking member 77 comprises a separate arm pivoted at pivot point 71 and positioned behind the arm 75 and with arm 75 including a backwardly bent tab 83 lying beneath the braking member 77 so that when arm 75 pivots in a clockwise direction about the pivot point 71, so also does the braking member 77. Thus, the lower surface of the brake arm near the brake pad end engages this abutment 83 so that lever arm movement is effective to force the brake pad into engagement with the annular surface.

The drawing illustrates generally at 85 an electric start motor which may include a gear arrangement for selectively engaging an outer toothed region 87 of flywheel 15. When the switch 49 has its control arm 51 in the position between lines 89 and 90 this motor 85 will be energized while in other positions or switch modes the motor 85 is not energized. The drawing also generally indicates an engine ignition system at 91 having a high tension lead 93 to sparkplug 95 and this engine ignition system will be disabled, for example, by grounding a primary lead on an ignition transformer when switch control arm is in the position between lines 96 and 97 corresponding to the brake or stop mode, and in the other switch modes the ignition is not disabled. The intermediate positions between lines 90 and 96 of switch arm 51 are for the normal running mode where the starter 85 is not enabled and the ignition system is not disabled.

The safety device of the present invention may, of course, be employed on a wide variety of engine powered implements including, for example, internal combustion engine powered implements of the manual-start variety. The deadman lever 19 as well as the starter control lever 25 may also take a number of different forms. For example, controls are commercially available where the deadman lever takes the form of a control ball having a configuration similar to the upper portion of the implement handle and pivotally attached to the two sides of that handle a few inches down from the uppermost end thereof. One of the pivotal attachment points of the ball may include an enclosure also containing the engine starting control lever with the engine starting lever being movable only when the bail is drawn to the handlebar by the operator. Such a bail-type control is manufactured by Wescon Products Company of Wichita, Kans. Other commercially available control units may also be employed.

From the foregoing it is now apparent that a novel safety device for an internal combustion engine powered implement has been disclosed having a nearly constant cable force which the operator must apply to maintain the implement in its running mode and otherwise meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. A safety device for an internal combustion engine powered implement including an engine ignition system, engine starting mechanism and having a deadman control normally biased toward a first position and actuable by an implement operator to a second position comprising:
   a flywheel coupled to the engine crankshaft for rotation therewith;
   a braking member having a friction surface normally biased into engagement with an annular surface of the flywheel;
   means biasingly coupling the braking member to the deadman control for retracting the friction surface out of engagement with the flywheel annular surface upon movement of the deadman control to the second position and including a pivotable linkage having first and second lever arms pivotably fastened to the engine and a third lever arm pivotably joining the first and second arms to cause the first and second arms to pivot in unison about their respective engine pivot points to move the braking member relative to the flywheel annular surface with substantially constant biasing force on said deadman control.

2. The safety device of claim 1 further comprising switch means actuable in accordance with movement of the braking member toward its flywheel engaging position to disable the engine ignition system.

3. The safety device of claim 1 wherein the biasing of the deadman control and the biasing of the braking member are both accomplished by the same means.

4. The safety device of claim 3 wherein the biasing of the deadman control and of the braking member is accomplished by a spring joining the third and one of the first and second lever arms, the braking member comprising a friction surface supporting lever pivotably attached near one end thereof to the engine at one of the first and second lever arm engine pivot points.

5. The safety device of claim 2 wherein the implement includes an operator actuable engine starting mechanism, the switch means being actuated in accordance with movement of the braking member toward its flywheel engaging position to disable the engine starting mechanism.

6. The safety device of claim 1 comprising a spring joining the thrid and one of the first and second lever arms and urging the thus joined lever arms in a relative pivotable manner about their common pivot point.

7. The safety device of claim 6 wherein the spring joined lever arms form a toggle biased by the spring to urge the braking member toward the flywheel annular surface, the spring joined lever arms being relatively angularly oriented so as to allow the spring to present a relatively constant force resisting motion of the deadman control toward the second position.

8. The safety device of claim 7 wherein the toggle angle is about 93° when the braking member is maximally distant from the annular surface and about 118° when the braking member engages the annular surface.

9. The safety device of claim 1 wherein the braking member comprises a brake arm pivoted at one of the first and second lever arm engine pivot points and having a brake pad as the friction surface near the opposite end thereof, the brake arm including means near the brake pad end for engagement by one of said lever arms whereby lever arm movement is effective to force the brake pad into engagement with the annular surface.

10. The safety device of claim 1 further comprising switch means responsive to movement of one of said lever arms to disable the engine ignition system when the deadman control is released by an operator.

11. The safety device of claim 10 further comprising an operator actuable starter control operatively connected to said coupling means effective when the deadman control is in the second position to further move the lever arms and to place the switch means in a start mode for enabling an electric starter of the engine.

12. A safety device for an internal combustion engine powered implement including engine ignition means, an electric engine starter and having a deadman control normally biased toward a first position and actuable by an implement operator to a second position and effective to rapidly halt implement operation upon release of the deadman control by the operator comprising:

a flywheel coupled to the engine crankshaft for rotation therewith, the flywheel being provided with a first annular friction surface lying generally in a plane normal to the axis of rotation of the flywheel;

a braking member having a second friction surface normally biased into engagement with the flywheel first friction surface; and means biasingly coupling the braking member to the deadman control for retracting the second friction surface out of engagement with the first annular friction surface upon movement of the deadman control to the second position by the implement operator including a spring biased toggle moveable between a folded position and an extended position as the deadman lever moves respectively between the first and second positions to provide a substantially constant force opposing operator actuation of the deadman lever.

13. The safety device of claim 12 wherein the biasing of the deadman control and the biasing of the braking member are both accomplished by same means.

14. The safety device of claim 13 wherein the biasing of the deadman control and of the braking member is accomplished by a spring joining a pair of adjacent toggle arms, the braking member comprising a friction surface supporting lever pivotably attached near one end thereof to the engine.

15. The safety device of claim 12 further comprising three mode switch means operatively connected to said coupling means and operable in unison with toggle movement for disabling the engine ignition means when the deadman control is released, enabling the engine ignition means when the deadman control is in the second position, and for engaging an electric engine starter upon further operator initiated toggle movement after the deadman control is in the second position.

* * * * *

UNITED STATES PATENT AND TRADEMARK OFFICE
CERTIFICATE OF CORRECTION

PATENT NO. : 4,519,486

DATED : May 28, 1985

INVENTOR(S) : William O. Hermanson

It is certified that error appears in the above-identified patent and that said Letters Patent is hereby corrected as shown below:

Col. 4, line 26, change "closkwise" to --clockwise--.
Col. 5, line 64, change "ball" to --bail--.
Col. 5, line 68, change "ball" to --bail--.
Col. 6, line 64, Cl. 6, change "thrid" to --third--.

Signed and Sealed this

Eighth Day of October 1985

[SEAL]

Attest:

DONALD J. QUIGG

*Attesting Officer*

*Commissioner of Patents and Trademarks—Designate*